United States Patent

Kuhne

(10) Patent No.: US 8,905,463 B2
(45) Date of Patent: Dec. 9, 2014

(54) BUMPER SYSTEM FOR A MOTOR VEHICLE

(75) Inventor: Steffen Kuhne, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 11/250,553

(22) Filed: Oct. 17, 2005

(65) Prior Publication Data

US 2006/0082169 A1    Apr. 20, 2006

(30) Foreign Application Priority Data

Oct. 16, 2004   (DE) .......................... 10 2004 050 435

(51) Int. Cl.
*B60R 19/18*    (2006.01)
*B60R 19/12*    (2006.01)
*B60R 19/52*    (2006.01)

(52) U.S. Cl.
CPC .............. *B60R 19/18* (2013.01); *B60R 19/52* (2013.01); *B60R 19/12* (2013.01)
USPC ..................................... 296/187.09; 293/133

(58) Field of Classification Search
USPC ................... 293/115, 132, 133, 143, 34, 38; 296/187.09
See application file for complete search history.

(56) References Cited

U.S. PATENT DOCUMENTS

| 1,569,743 | A | * | 1/1926 | Goodwin .......................... 293/34 |
| 3,899,047 | A | * | 8/1975 | Maeda et al. .................. 293/133 |
| 4,099,760 | A | * | 7/1978 | Mascotte et al. .............. 293/115 |
| D259,873 | S | * | 7/1981 | Milner .......................... D12/171 |
| 4,466,646 | A | * | 8/1984 | Delmastro et al. ............. 293/132 |
| 6,224,120 | B1 | * | 5/2001 | Eipper et al. .................. 293/132 |
| 6,948,767 | B2 | * | 9/2005 | Makita et al. ............ 296/187.09 |
| 7,059,031 | B1 | * | 6/2006 | Elwell et al. .................. 293/115 |
| 7,261,346 | B1 | * | 8/2007 | Kubesh .......................... 293/115 |
| 2004/0239149 | A1 | * | 12/2004 | Kosaka .................... 296/187.09 |
| 2005/0046205 | A1 | * | 3/2005 | Tanaka .......................... 293/115 |

FOREIGN PATENT DOCUMENTS

| DE | 89 14 819.3 | 12/1989 |
| DE | 198 35 572 | 2/2000 |
| DE | 198 52 959 | 5/2000 |
| EP | 1 433 664 | 6/2004 |

* cited by examiner

*Primary Examiner* — Jason S Morrow
(74) *Attorney, Agent, or Firm* — Novak Druce Connolly Bove + Quigg LLP

(57) ABSTRACT

The invention relates to a bumper system with which the requirements for compatibility between motor vehicles can be accommodated. In particular the invention relates to a bumper system for a motor vehicle which has a force distributing element (10) and which is characterized in that in at least two planes at different heights there are force absorbing components (20, 13) on the motor vehicle (2) and the force distributing element (10) is mounted on the force absorbing components (20, 13) and connects the force absorbing components (20, 13).

7 Claims, 2 Drawing Sheets

BUMPER SYSTEM FOR A MOTOR VEHICLE

This application claims priority from German Application No. 10 2004 050 435.0, filed Oct. 16, 2004.

BACKGROUND

The invention relates to a bumper system for a motor vehicle.

Bumpers on motor vehicles are designed for transmission of the energy generated by forces in the impact of a motor vehicle against a barrier. Bumpers are generally located on the front and rear of the motor vehicle.

In order to be able to adequately absorb the force which acts on the motor vehicle in a frontal impact without having to tolerate major deformation of the passenger compartment, bumper systems are generally designed such that the bumpers are provided at the height of the longitudinal members of the motor vehicle and are connected to them. In this way the force can be routed by way of the bumpers into the longitudinal members. Since currently the height of motor vehicles varies greatly even in passenger cars, when two vehicles collide however the case may occur that the bumpers of the two motor vehicles do not meet one another. This problem is especially critical in four-by-fours or in so-called sports utility vehicles (SUVs) since their height differs greatly from the height of other passenger vehicles. An extreme case arises especially in a frontal impact, i.e., a front crash, of such a SUV with a low-slung sports car. To be able to accommodate this difference in heights, but also to be able to reduce the loads on the passenger compartment, the force which acts in an impact must be distributed among as many load paths as possible provided for this purpose.

EP 1 199 224 A1 proposes for distribution of the force a bumper in which under the cross member there is a transverse beam spaced at a distance. Here the transverse beam is connected to stop plates by way of spacer braces. In the proposed configuration the cross member is also connected to these stop plates by way of spacer brackets. The stop plate is mounted on the front end of the longitudinal member of the motor vehicle.

The disadvantage of this configuration on the one hand is that there is a distance between the cross member and the transverse beam. The proposed configuration can ensure adequate transmission of the impact energy into the longitudinal member based on this distance only in an impact in which the force is transmitted at the height of the cross member or at the height of the transverse beam. In a collision in which the height of transmission of the force is at the height between the cross member and the transverse beam, the cross member and the transverse beam cannot be used for transmission of the force. This situation may occur for example in a collision with a second motor vehicle of different height.

Another disadvantage of the disclosed bumper configuration consists in that upon impact against the transverse beam the force strikes the bumper configuration at an angle to the longitudinal member. This can lead to the spacer braces snapping. If this snapping is to be avoided, the material thickness of the spacer braces must be selected to be geometrically large; this results in a weight increase of the bumper configuration. This is disadvantageous in view of the continuous effort to keep the weight of a motor vehicle low. Moreover the longitudinal members may break when the force is transmitted by way of the transverse beam.

SUMMARY OF THE INVENTION

The object of this invention is therefore to devise a bumper system for a motor vehicle in which sufficient compatibility between motor vehicles of different heights can be ensured, the transmission of the force being guaranteed in a plurality of heights.

The invention is based on the finding that this object can be achieved by providing force absorbing components on the motor vehicle in planes at different heights and by providing a force distributing element for distribution of the acting load among the different planes.

The object is therefore achieved as claimed in the invention by a bumper system for a motor vehicle having a force distributing element, the bumper system being characterized in that in at least two planes at different heights on the motor vehicle there are force absorbing components and the force distributing element is mounted on the force absorbing components and connects the force absorbing components.

For the purposes of this invention the force absorbing components are defined essentially as components which are rigidly connected to the body of the motor vehicle or which form a part of the body. Moreover the force absorbing components for the purposes of this invention extend essentially in the longitudinal direction of the motor vehicle and have high flexural strength. In particular the force absorbing components can be members which are positioned in the longitudinal direction of the motor vehicle, for example the longitudinal members of a ladder-type frame, the chassis frame or the floor pan of the vehicle body. The distance of these parts from the ground on which the motor vehicle is located is designated the height at which the force absorbing components are provided.

The force distributing element is mounted on the force absorbing components preferably on the front end of the force absorbing components, direct or indirect attachment, i.e., attachment using intermediate elements, being suitable. In the latter case the intermediate elements are also aligned in the longitudinal direction of the motor vehicle and the force distributing element mounted on the sides of the intermediate elements facing away from the force absorbing components. The type of attachment of the force distributing element on the force absorbing components or the intermediate elements which may be provided may be a weld connection, a screw or rivet connection depending on the choice of material for the force distributing element and the force absorbing components. Here the type of attachment to different force absorbing components of a bumper system may vary.

By providing force absorbing components at different heights of the motor vehicle and by connecting all force absorbing components by means of the force distributing element, a bumper system can be produced in which the force acting on the motor vehicle can be distributed among several planes of the motor vehicle and thus among several components. The distribution of forces yields uniform deformation behavior which is necessary for compatibility in the front end and corrosive-susceptible recesses are avoided. Another requirement which must be met to satisfy the compatibility criteria is that a cross connection of the longitudinal members which is provided in the so-called front end of the motor vehicle is maintained even upon deformation. This is likewise made possible by the force distributing element which is mounted as claimed in the invention on all force absorbing components. The support of the force distributing element on at least four connecting points to the force absorbing components and the resulting necessarily large dimensioning of the force distributing element in the vertical direction increases the stability of the entire bumper system.

Another advantage of the bumper system of the invention is that the front end of the motor vehicle forms a homogeneous, stiff structure. Moreover, the system is less prone to transverse forces by connecting the force absorbing components by means of the force distributing element.

The connection of the different planes is implemented such that there is a rigid interconnection of the force absorbing components in the different planes. In the simplest case the interconnection can be formed between the planes by also using vertical members which interconnect two essentially superimposed force absorbing components in addition to the cross members which are provided in one plane between the force absorbing components. The cross members and the vertically aligned members may be combined into a frame.

Behind the force distributing element there may be coupling elements which also interconnect the force absorbing components at depths which are located behind the force distributing element, particularly in the vertical direction.

In one preferred embodiment the force distributing element is however flat and has openings at least between the planes in which the force absorbing components are provided. This ensures the passage of air through the force distributing element. In motor vehicles the requirements for engine cooling are being increasingly raised. This cooling takes place partially by the head wind which makes contact with the vehicle. Said head wind should therefore be able to make its way into the interior of the motor vehicle as unhampered as possible, especially into the front end of the vehicle. The head wind can travel through openings which at least between the planes in which there are force absorbing components to the components of the motor vehicle which are located behind the force distributing element.

The openings are preferably distributed in the force distributing element such that between them webs are formed which extend in a straight line between the edges of the area in which the openings are provided. In this way the stability of the force distributing element can also be maximized in the area having openings.

The surface over which the force distributing element extends corresponds at least to the surface which is defined by the connecting points of the force distributing element to the force absorbing components. In this way a surface as large as possible which is available for transmission of forces can be provided in an impact against a barrier. Thus, even in a frontal collision with a motor vehicle with a bumper located at a height between the planes of the force absorbing components provided as claimed in the invention the force which is generated by the impact may be introduced into the force absorbing components. Moreover this force distributing element is also suited to ensuring sufficient force distribution even for transmission of local forces. This transmission of local forces can occur for example in the impact of a motor vehicle with the end of a guardrail or other barrier, such as a fixed pole.

By preference the force distributing element constitutes an integral component, i.e., a component with a one-piece design. In this way sufficient force distribution over the entire element can be ensured. But it is also within the scope of the invention to assemble the force distributing element from several components. For this purpose the individual components however are rigidly joined to one another in order to be able to ensure force distribution.

In one preferred embodiment the force distributing element constitutes a grating. This structure on the one hand entails the advantage that the overall weight of the bumper system can be kept low. Furthermore sufficient air supply to the engine can be maintained. Moreover, for a grating, especially for a grating which has longitudinal and cross braces, force is transmitted over the width and the height of the force distributing element. Gratings are especially suitable in which the dimensions of the braces which form the grating are greater perpendicular to surface of the grating than the dimension of the braces in the area of the grating. Gratings with these braces are preferable to gratings with braces which have round cross sections, since they increase the flexural strength of the entire grating. Gratings can also be used in which two groups of braces of different cross section are used, the two groups each having a different alignment. The two groups can for example be configured perpendicular to one another.

Another advantage of using a grating consists in that it is possible to shape it during the production process and thus to form different contours. Those can be especially the contours of the front or rear of the motor vehicle.

The force distributing element may comprise reinforcing means which are preferably configured at least in the area of at least two planes of the force absorbing components. The reinforcing means may be integrated into the force distributing element or may be attached to it. Thus for example a cross member which is provided between the force absorbing components in one plane may be used as the reinforcing means. In the embodiment in which the force distributing element has webs, webs with a greater material thickness or greater width may be used as reinforcing means.

Furthermore, there may be reinforcing means at the connecting points between the force absorbing components and the force distributing element. Especially when the force distributing element is designed as a grating they can constitute mounting plates which may be integrated into the force distributing element or may be connected to it.

A plane in which at least one of the force absorbing components is provided lies preferably at the height of the longitudinal member of the motor vehicle. For the purposes of the invention the longitudinal members of the motor vehicle are the longitudinal members which are designed for stabilization of the body in the longitudinal direction in the motor vehicle and which are routed to the front or rear of the motor vehicle. In particular, these longitudinal members can be part of the ladder-type frame, the body itself or the chassis frame. Another plane in which there are force absorbing components as claimed in the invention is preferably offset down to the plane of the longitudinal members of the motor vehicle. In this way it becomes possible to increases the area over which the action of the force on the bumper system can be introduced into the motor vehicle downward. This is especially advantageous for motor vehicles with a great height, since rolling over a motor vehicle of smaller height can thus be avoided. The lower plane as claimed in the invention can be situated at a height which corresponds to the axial height of the motor vehicle or is preferably smaller than the axial height of the motor vehicle.

The force absorbing components in the plane of the longitudinal members of the motor vehicle are preferably the longitudinal members of the motor vehicle itself. In at least one other plane additional members can be used which are attached to the body, the chassis, to the power train, for example the engine block, or an auxiliary structure, and likewise extend in the longitudinal direction of the motor vehicle. If the other plane is situated underneath the plane of the longitudinal member of the motor vehicle, additional members can be attached to an auxiliary frame which interacts with the floor pan area. But it is also possible as claimed in the invention for the additional members to be mounted in at least one other plane, not on the body or the other aforementioned components, but simply to be supported in the case of a crash against the body, the chassis, the powertrain, for example the engine block, or an auxiliary structure in the other plane. This is especially advantageous when the motor vehicle component against which the additional member is supported in the case of a crash is spring-mounted. The additional members are attached to the motor vehicle preferably by way of the longitudinal members. In particular the additional members can be attached to the underside of the longitudinal members. Between the additional member and the longitudinal member there can be a coupling element, for example, in the form of a bracket for this purpose.

The force distributing element can extend beyond the connecting points to the force absorbing components in the direction of the width and height. The projecting lengths in the direction of the width can be used especially to be able to transmit the actions of the force which arise outside of the longitudinal members of the motor vehicle on the bumper system. Thus, when the motor vehicles overlap in a collision less than 50% the force distributing element is still impacted and the force can be transmitted to the force absorbing components.

Intermediate elements can be provided between the force absorbing component and the force distributing element at the connecting points next to the previously mentioned reinforcing means in the form of mounting plates. Members, for example hollow members, can be used as the intermediate element. They perform especially the function of a deformation element. The intermediate elements are preferably mounted on the front end of the respective force absorbing component, especially of the longitudinal and additional members, in order to be able to convert small forces into deformation energy without relaying the force to the force absorbing components. If these intermediate elements are situated in the area of the deformation zone in a type damage test, they can be made interchangeable.

The force distributing element is preferably made of metal, especially of steel or an aluminum allow. In any case the material of the force distributing element is chosen such that high flexural strength can be imparted to this element.

The bumper system as claimed in the invention can be integrated into the motor vehicle such that for example there are facing parts or other elements in front of it. The facing parts are used especially to prevent a direct view of the bumper system. This enhances the visual appearance of the motor vehicle. Other components can be for example additional deformation elements. As much as possible the facing parts or other components mounted in front of the bumper are selected such that air passage is maintained in the area between the planes.

With the bumper system as claimed in the invention the criteria of future laws and classifications or ratings with respect to compatibility can be satisfied.

BRIEF DESCRIPTION OF THE DRAWINGS

This invention is explained again below using the attached figures in which.

DETAILED DESCRIPTION OF THE INVENTION

Figure 1:
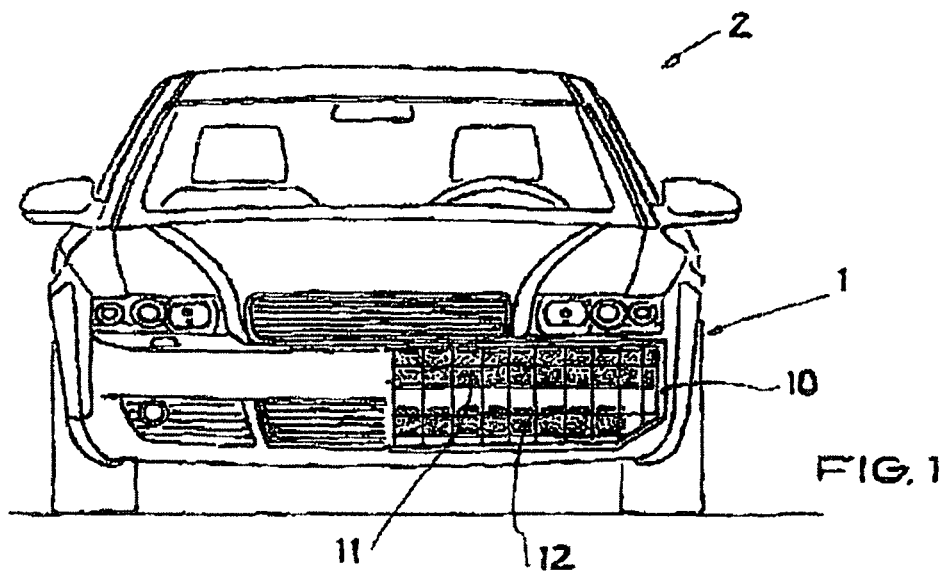
FIG. 1 shows a schematic front view of a motor vehicle with one embodiment of the bumper system as claimed in the invention.

FIG. 1 shows a schematic front view of a motor vehicle 2 with a bumper system 1 according to one embodiment of this invention. For a better understanding the facing elements in the area of the bumper system are not shown on the right side.

Figure 2:
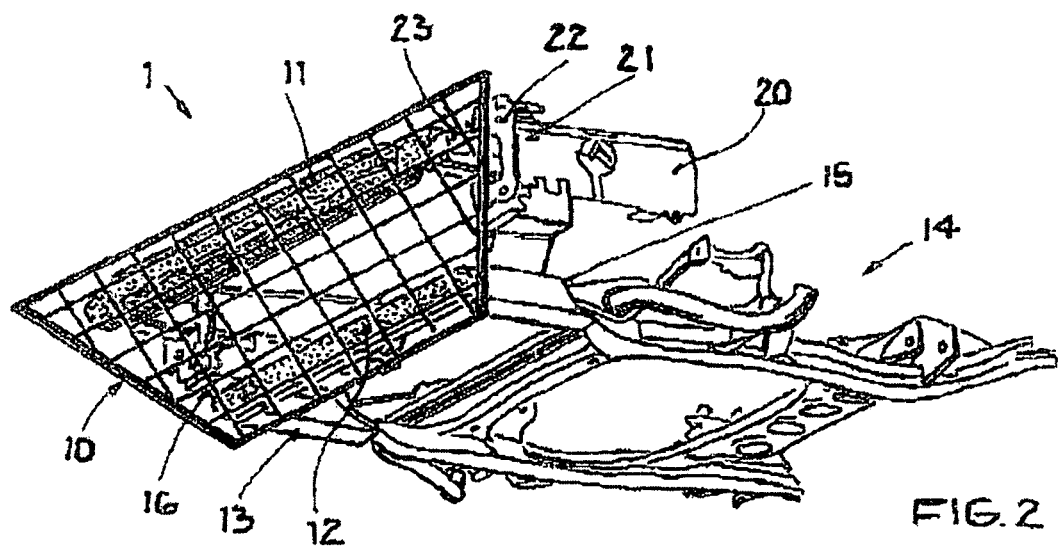
FIG. 2 shows a schematic perspective view of the embodiment of the bumper system as claimed in the invention as shown in FIG. 1.

The structure of this embodiment is described with reference to FIGS. 1 and 2. The bumper system 1 comprises a force distributing element 10 which in the illustrated embodiment is a grating. At the height of the longitudinal member 20 of the motor vehicle 2 there is a cross member 11 which is connected to the front ends 21 of the longitudinal members 20 by way of stop plates 22 and intermediate elements 23. The cross member 11 has a relatively low vertical extension, i.e., has a low height. Underneath the cross member 11 on the lower plane there is another cross member 12. The latter is mounted on the additional members 13.

The force distributing element 10 in the form of a grating is mounted on the front of these two cross members 11, 12.

FIG. 2 again shows the structure of the bumper system 1. As this perspective view shows, on the lower plane there is an auxiliary plane 14 which can be connected to the body for example in the area of the floor pan (not shown) of the motor vehicle 2. Additional members 13 are mounted on the front of the auxiliary frame 14. They are fixed on the auxiliary frame 14 by way of a connecting profile 15 in the embodiment shown. This embodiment can be selected especially when the auxiliary frame 14 is rigidly mounted, especially rigidly mounted on the body. If conversely an auxiliary frame 14 or another auxiliary structure, which is spring-mounted, is used for example by way of a rubber support, the additional members 13 are detachably connected to this auxiliary frame 14. In this case the additional members 13 can be mounted on the bottom of the longitudinal members 20 for example by way of the coupling elements 16 which are shown in FIG. 2 and are supported in the event of a crash on the connecting profile 15 of the auxiliary frame 14.

A rigid interconnection between the planes in which the longitudinal members 20 and the additional members 13 are each provided is produced by the grating 10.

In addition, in the illustrated embodiment there is a coupling element 16 which is provided between a respective longitudinal member 20 and the underlying additional member 13. The coupling element 16 is rigidly connected to the members 20, 13 and is for example screwed or welded to them. The overall stability of the bumper system 1 is thus further improved.

The length of the auxiliary members 13 and other fixing means, such as that of the illustrated auxiliary frame 14, is preferably selected such that the additional members 13 end offset to the rear compared to the longitudinal members 20, including the stop plate 22 and the deformation element 23, i.e., they end in the direction of the interior of the motor vehicle 2. In this way the requirement of the angle of driving slope can be taken into account.

Figure 3:
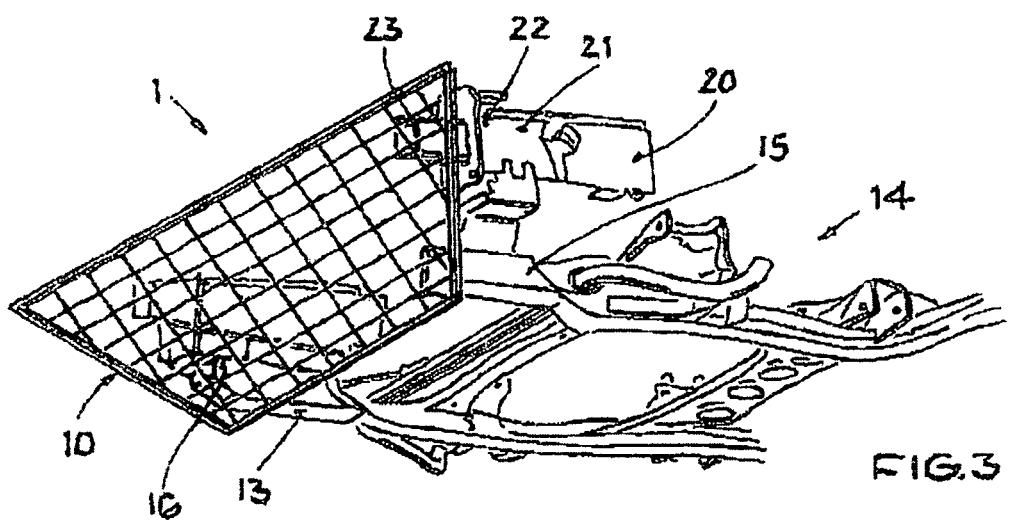
FIG. 3 shows a schematic perspective view of another embodiment of the bumper system as claimed in the invention.

FIG. 3 shows another embodiment of the bumper system in the invention. The bumper system 1 has essentially the same structure as the bumper system shown in FIG. 2. In this embodiment the force distributing element 10 however is connected directly to the force absorbing components 20, 22 or the deformation elements 23. There are no cross members in this embodiment. The required flexural strength of the bumper system 1 is thus delivered exclusively by the force distributing element 10 which is made as a grating operating in conjunction with the longitudinal members 20 and the additional members 13. The advantage of this embodiment is especially that the weight of the bumper system is reduced and air is not prevented from flowing to the engine. The air can pass unobstructed through the openings 103 formed between the braces 101 and 102 which form the grating, i.e., through the openings 103 which are formed between the braces 101 and 102.

Figure 4:
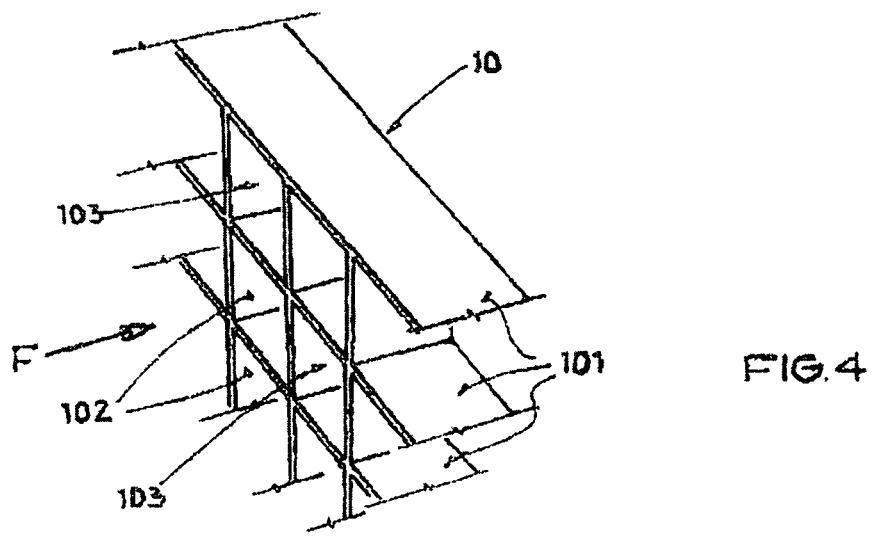
FIG. 4 shows a schematic perspective view of one embodiment of a force distributing element for a bumper system.

One possible structure of the grating 10 which can be used for the bumper system 1 as claimed in the invention is schematically shown in FIG. 4. The cross section of the groups of braces 101 and 102 is the same in this configuration. The braces of the two groups 101 and 102 have a rectangular cross section and are configured at right angles to one another. If a force which is indicated in the figure by an arrow F strikes such a grating from one direction forward, deformation of the grating can be prevented to the greatest extent possible.

This invention is not limited to the illustrated embodiments. For example, the braces of the grating can also be configured at an angle to one another and/or tilted to one another.

Furthermore the grating can have reinforcing means which can likewise be made in the form of braces. In particular, these reinforcing means are advantageous on the edge of a grating. The reinforcing means can for example represent braces with a greater width and material thickness.

Furthermore it is possible to integrate the cross members shown in FIG. 1 into the force distributing element.

Although the force distributing element in the figures is always shown as a flat plate, it is within the scope of this invention to adapt this element to the contour of the front section or rear section of the motor vehicle. In particular, it is possible to extend the force distributing element beyond the longitudinal members. In these areas the ends of the force distributing element have a curvature in order to adapt to the contour of the front or rear corners and also to be able to accommodate to a certain extent an impact on one of the corners.

The configuration of the lower plane shown in the figures is not limited to the illustrated shape either. Furthermore, there can be an attachment for energy absorption on the front ends of the additional members. For example an impact plate with a deformation element provided on it can be used, the force distributing element being mounted on the deformation element.

With this invention a solution to optimizing the requirements for compatibility between motor vehicles is devised without the need for a complex production process or increasing the weight of the system. Moreover other requirements such as adequate engine ventilation can also be accommodated. By increasing the compatibility, both the protection of the driver of a motor vehicle configured with the bumper system as claimed in the invention and also the driver of the other vehicle involved in a collision can be better protected.

The invention claimed is:

1. An assembly mountable in a compartment of a motor vehicle having upper and lower, longitudinally disposed components, comprising:
    a single transversely disposable, rigid force distributing member spaced rearwardly of a grille thereof, provided with a plurality of longitudinally disposed openings;
    deformable means disposed between said force distributing member and said upper and lower, longitudinally disposed components; and
    upper and lower, transversely disposed rigid members interposed between said force distributing member and said deformable means.

2. The assembly of claim 1 wherein said force distributing member is connectable to components selected from a group including the chassis, power train, engine block and floor pan of said vehicle.

3. The assembly of claim 1 wherein said force distributing member is disposable in an engine compartment of said vehicle between a said grille and an engine of said vehicle.

4. The assembly of claim 1 wherein said force distributing member includes pluralities of first and second planar members angularly interconnected to form a grid, providing a plurality of longitudinally disposed openings.

5. The assembly of claim 4 wherein said first and second planar members are angularly connected at right angles.

6. The assembly of claim 4 wherein said first and second planar members are angularly connected at acute angles.

7. The assembly of claim 1 wherein said force distributing member is formed of an alloy including one of a group including steel and aluminum.

\* \* \* \* \*